United States Patent [19]

Brawley, Sr. et al.

[11] Patent Number: 5,832,810
[45] Date of Patent: Nov. 10, 1998

[54] COOKING FLUID CONTAINER AND STORAGE SYSTEM AND METHOD

[75] Inventors: Robert D. Brawley, Sr., Lithonia; Lawrence W. Clark, Lilburn, both of Ga.

[73] Assignee: Mārine Kleen, Inc., Lithonia, Ga.

[21] Appl. No.: 780,829

[22] Filed: Jan. 10, 1997

[51] Int. Cl.⁶ ................................ A47J 37/12; B65D 5/48
[52] U.S. Cl. .................................. 99/408; 99/403; 99/446; 206/223
[58] Field of Search .............................. 99/408, 446, 444, 99/403, 410; 220/403, 404, 410, 462; 53/467, 469, 473, 173, 175; 206/223; 229/120.35, 120.36, 117

[56] References Cited

U.S. PATENT DOCUMENTS

| | | |
|---|---|---|
| 3,973,481 | 8/1976 | Mies . |
| 4,574,183 | 3/1986 | Knauss . |
| 4,895,250 | 1/1990 | Schifrin ............................ 220/404 X |
| 4,899,649 | 2/1990 | Grob et al. . |
| 4,945,893 | 8/1990 | Manchester . |
| 5,018,637 | 5/1991 | Miller ................................ 220/404 |
| 5,042,682 | 8/1991 | Ritter et al. . |
| 5,247,876 | 9/1993 | Wilson et al. . |
| 5,295,606 | 3/1994 | Karwoski .......................... 220/404 X |
| 5,356,022 | 10/1994 | Tipps . |
| 5,363,980 | 11/1994 | Mulcahy ............................ 220/404 |
| 5,427,267 | 6/1995 | Willman . |
| 5,622,276 | 4/1997 | Simmons ........................... 220/404 X |

Primary Examiner—Reginald L. Alexander
Attorney, Agent, or Firm—Morris, Manning & Mārtin, L.L.P.

[57] ABSTRACT

A cooking fluid container and storage system for containing and storing a cooking fluid drained from a deep fryer cooker includes a container assembly supported for translation by a cart. The container assembly includes a rigid, paper board outer container and a plastic bag inner container. The outer container receives a lid to close the outer container. The container assembly supported by the cart is configured to be selectively positionable beneath a drain spout of the deep fryer cooker. A cooking fluid, such as cooking oil, residing in the deep fryer cooker may be selectively drained into the plastic bag supported by the outer container. The plastic bag is then sealed, the lid is installed, and then the container assembly is moved away from the deep fryer cooker and deposited in a storage area. The method of the present invention includes the steps of positioning the container assembly adjacent a deep fryer cooker, causing a cooking fluid within the deep fryer cooker to be introduced into the inner container supported by the outer container, sealing the inner container to prevent spillage of the cooking fluid, and moving the container assembly to a storage area. The method further includes the step of supporting the container assembly on a cart that is adapted for translation across a support surface.

15 Claims, 3 Drawing Sheets

COOKING FLUID CONTAINER AND STORAGE SYSTEM AND METHOD

TECHNICAL FIELD

The present invention relates generally to a fluid container and more particularly to a fluid container and storage system for containing and storing a cooking fluid.

BACKGROUND OF THE INVENTION

Deep frying foods in a deep fryer cooker is a well known method for cooking foods such as French fries, chicken and fish. Deep frying is used both commercially and domestically. A deep fryer cooker generally comprises a frying vessel having a cooking fluid reservoir which is supported by a frame. A heating element for heating a cooking fluid, such as vegetable oil or melted lard, is disposed exteriorly of the frying vessel or, alternatively, is positioned within the cooking fluid reservoir for direct contact with the cooking fluid.

Deep frying involves cooking temperatures in the range of 300°–450° F. Food to be cooked in a deep fryer cooker is typically loaded into a metal basket having screen sidewalls to allow the free circulation of hot cooking fluids into the basket and around the food. The metal basket is lowered into the heated cooking fluid residing in the fluid reservoir of the frying vessel. The food is allowed to cook for a predetermined period of time or until done. The exterior surface of most foods cooked in a deep fryer cooker becomes crispy and light brown in color.

The cooking fluids used in most commercial deep fryer cookers are changed on a regular basis to renew the cooking qualities of the oil. One reason oil is changed is that the small particles of food, particularly coatings such as flour applied to the food to enhance the crispness and color of the exterior surface, migrate from the food to the oil. The small particles may float on top of the cooking fluid surface, be suspended within the cooking fluid, or may sink to the bottom of the cooking vessel reservoir. After an extended period of time, the heated cooking fluid burns the small particles of food. The burned food particles tend to impart an unpleasant taste to the cooking oil. Also, as the concentration of the food particles in the cooking fluid increases, deposition of the burned particles on cooked food becomes a problem, imparting not only an unpleasant taste but giving the food an unpleasant appearance.

The cooking temperatures to which the cooking fluids are heated also causes the fluids to decompose. Decomposition may cause the cooking fluids to discolor and take-on an unpleasant taste. Also, the cooking oil may become rancid if used too long. Thus, the cooking fluid should be changed on a periodic basis to avoid these problems and others.

Known methods for changing cooking fluids include draining the fluids from the reservoir of the cooking vessel into a holding container. Drainage is facilitated by providing a drain spout defining a spout aperture that is in fluid communication with the fluid reservoir of the vessel. A cap or valve arrangement is typically provided so that the flow of the cooking fluid from the reservoir into the holding container can be selectively controlled.

Known holding containers comprise metal tubs or trays placed alongside or underneath the deep fryer cooker. These containers typically comprise a container bottom with an upstanding sidewall which defines an opening having a relatively wide area. Often, the deep fryer cooker cabinet and frame are adapted to allow the holding container to be stored beneath the cooker adjacent the drain spout so that the likelihood of spillage during the fluid changing process is reduced.

After the cooking fluid is drained from the cooking vessel reservoir, the holding container is moved to a holding tank area where it is poured into holding tanks. During the move to the holding tank, the cooking fluid may spill from the holding container onto the ground, or floor, or onto the person carrying the holding container. At the holding tank, the holding container is usually lifted to pour the cooking fluid from the holding container into the holding tank. The heat and weight of the fluid may make this procedure uncomfortable and more fluid may be spilled. Consequently, transfer of the fluid from the fryer to the holding tank may not be very efficient. The spilled cooking fluid attracts vermin including roaches and rats which creates hazardous and unhealthy conditions, either at the holding tank area or in sewers, if the spilled fluid is carried into storm sewers. An oil reprocessing service periodically pumps the oil from the holding tanks or removes the holding tanks. The oil is then reprocessed by the processing service and sold to processors who use the cooking fluid as additives for agricultural feed or cosmetics, for example.

The value of the cooking fluids is determined in part by its relative purity and lack of adulteration by other materials. For example, if the holding tanks are stored outside and left exposed, rainwater may mix with the fluid. This adulteration of the fluid lowers its value to some purchasers. Additionally, some users of cooking fluids for agricultural feeds prefer some types of fluids over others. If different fluids are mixed in a holding tank, the usefulness of the fluid for such processors is diminished.

The known methods and apparatuses for draining, transferring and storing spent cooking fluids do not preserve the value of the cooking fluids for reuse or cause unsanitary conditions.

What is needed is a system and method which reduces spillage during transfer of cooling fluids from deep fryer cookers and which stores the fluid in a way that reduces adulteration of the fluid.

SUMMARY OF THE INVENTION

The present invention solves the above described problems by providing a container system and method for collecting and storing cooking fluid drained from a deep fryer cooker which reduces spillage and adulteration of the fluid. Generally described, the present invention includes a container assembly selectively mountable on a cart. The cart is adapted for translation on a support surface such as a floor or ground to move the container from adjacent the deep fryer cooker to another location such as a storage area for storing the containers holding cooking fluid. The container assembly is adapted to receive and securely contain and preserve the used cooking fluid drained from the deep fryer cooker.

Preferably, the container assembly of the present invention includes an outer container comprising an integral bottom wall and side wall extending perpendicularly from the bottom wall to provide a seamless box shaped as a rectangular prism. The outer container further includes a lid to enclose the storage area for the cooking fluid. Preferably, the outer container is fabricated of a unitary piece of corrugated paper board defining fold lines so as to provide a seamless structure to provide leak resistance for the outer container. In one embodiment of the present invention inner surfaces of the integral bottom wall and sidewall are treated with a leak resistant coating to further enhance the leak resistance of the outer container.

The container assembly of the present invention preferably includes an inner container nested within and supported by the outer container. The inner container preferably comprises a flexible bag which may be closed to enclose a volume of cooking fluid. The bag is nested within the outer container and opened to receive cooking fluid being drained from a cooker. The inner container is selectively sealable to form a first barrier to inhibit spillage of the cooking fluid. The inner container is preferably fabricated of a plastic film having chemical, mechanical and thermal properties suitable for high temperature cooking fluids.

The method of the present invention includes the steps of positioning a container assembly comprising an inner container supported within an outer container adjacent a deep fryer cooker, causing a cooking fluid within the deep fryer cooker to be introduced into the inner container supported by the outer container, sealing the inner container to prevent spillage of the cooking fluid, and moving the container assembly to a storage area. The method further includes the step of supporting the container assembly on a cart that is adapted for translation across a support surface.

BRIEF DESCRIPTION OF THE DRAWINGS

Other objects, advantages and features of the present invention will be more readily understood from the following detailed description of specific embodiments thereof when read in conjunction with the accompanying drawings, in which.

DETAILED DESCRIPTION

Figure 1:
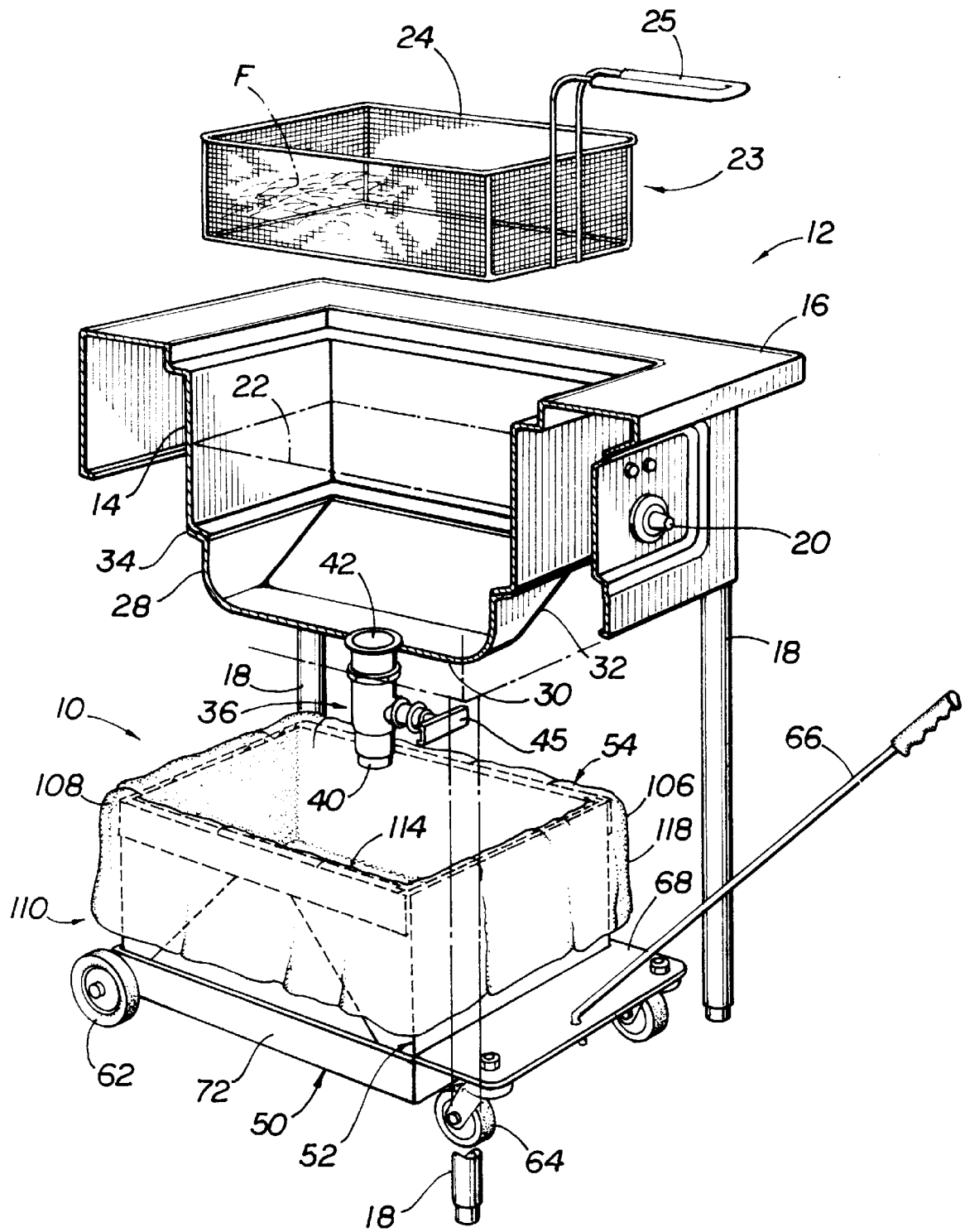
FIG. 1 is a perspective view of the container system of the present invention shown parked beneath a deep fryer cooker which is shown in partial cross section.

Looking now at FIG. 1 there is shown a cooking fluid container and storage system 10 shown positioned underneath a deep fryer cooker 12. The deep fryer cooker 12 comprises a rectangularly shaped frying vessel 14 suspended from a horizontal frame 16. The horizontal frame 16 is supported by legs 18 disposed at each of four corners of the frame 16.

A temperature control system 20 is mounted along a front portion of the deep fryer cooker 12. The temperature control system 20 controls the temperature of one or more heating elements (not shown) that heat a cooking fluid 22 disposed in the frying vessel 14. The cooking fluid 22 may be vegetable oil, melted lard or other materials that maintain a liquid state at elevated temperatures and are suitable for deep frying cooking. The cooking fluid 22, hereinafter referred to as cooking oil 22, is typically used at temperatures in the range of 325° to 425° F. A food container 23 having a basket portion 24 and handle 25 supports food F destined to be lowered into the heated cooking oil 22.

A sump 28 depends from a lower portion of the frying vessel 14. The sump 28 includes a bottom panel 30 and upwardly extending slanted side panels 32. The side panels 32 engage a lower side edge 34 of the frying vessel 14. The bottom panel 30 mounts a drainage assembly 36 which includes a spout 40 defining a spout bore 42 therethrough. The spout bore 42 is selectively disposed in fluid communication with the sump 28 and the cooking vessel 14 by a valve 45.

The cooking vessel 14 may be drained, when the need occurs, by opening valve 45 to allow cooking oil 22 to flow through spout bore 42 and into a suitable container positioned below spout 40. Slanted side panels 32 facilitate the full drainage of cooking oil 22 from cooking vessel 14 and sump 28 including any food particles residing in cooking oil 22.

Figure 2:
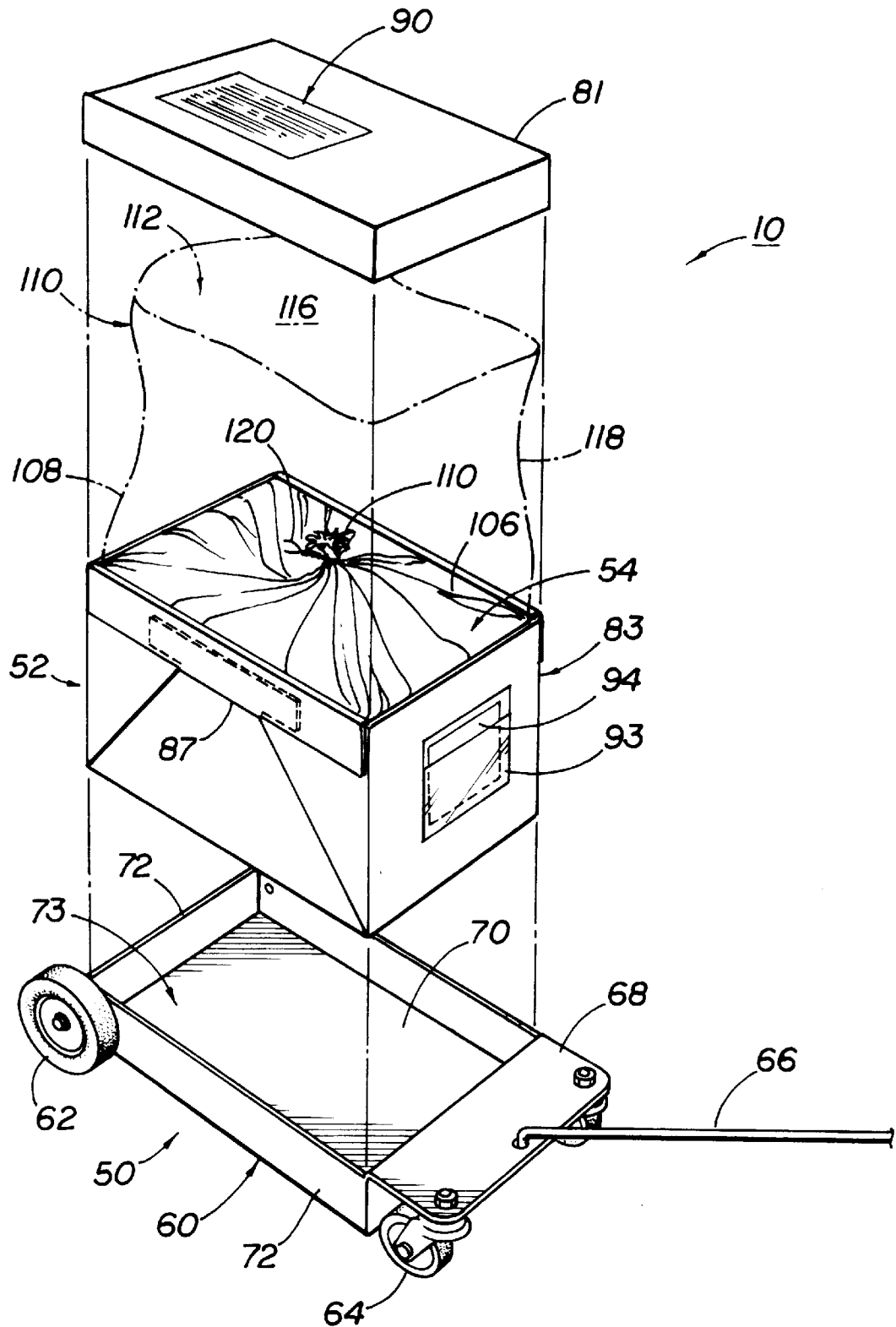
FIG. 2 is an exploded perspective view of the cart, the outer container and the inner container, shown sealed, of the container system.

As shown in FIGS. 1 and 2, cooking oil container and storage system 10 includes a cart 50 and a container assembly 51 supported by cart 50. Container assembly 51 comprises an outer container 52 and an inner container 54. Outer container 52 is selectively mountable in cart 50. Inner container 54, which preferably comprises a flexible plastic bag, is disposed within and supported by outer container 52. In use, cart 50 supporting container assembly 51 is positioned beneath deep fryer cooker 12 such that cooking oil 22 issuing from spout bore 42 flows into inner container 54 and preferably does not contact outer container 52.

Cart 50 includes a cart frame 60 supported by a pair of rear wheels 62 and front wheels 64. A handle 66 is preferably detachably mounted to a forwardly extending mounting member 68. Cart frame 60 includes a lower frame panel 70 and a plurality of frame side panels 72 extending from frame panel 70 substantially perpendicularly thereto. Frame side panels 72 and lower frame panel 70 define a well 73 which is preferably sized and configured to snugly receive a lower portion of the outer container 52 as shown in FIG. 2. Rear wheels 62 are supported in rotating engagement with the side panels 72 and are preferably of a rigid, non-swivel type. The front wheels 64 are preferably a swivel type caster and mount adjacent the underside of mounting member 68. Providing swivel casters for front wheels 64 allows cart 50 to be easily steered by handle 66.

Cart 50 is preferably sized and configured to define an overall width slightly narrower than the spacing between the forward pair of legs 18 of a deep fryer cooker, as shown in FIG. 1, 12 so that cart 50 may be easily and conveniently positioned below sprout bore 42 of deep fryer cooker 12. Other sizes for cart 50 may be used for other types of deep fryer cookers.

Figure 3B:
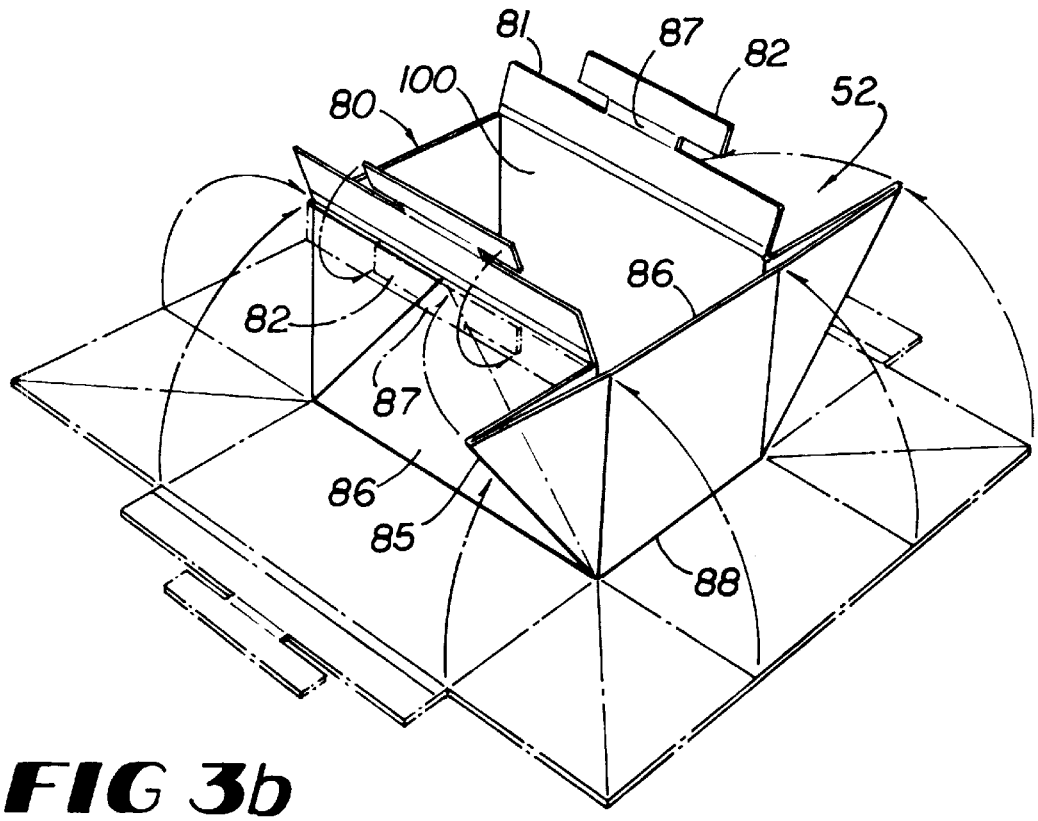
FIG. 3b is a perspective view of the outer container with the rear end fully folded and the forward end partially folded.
Figure 3A:
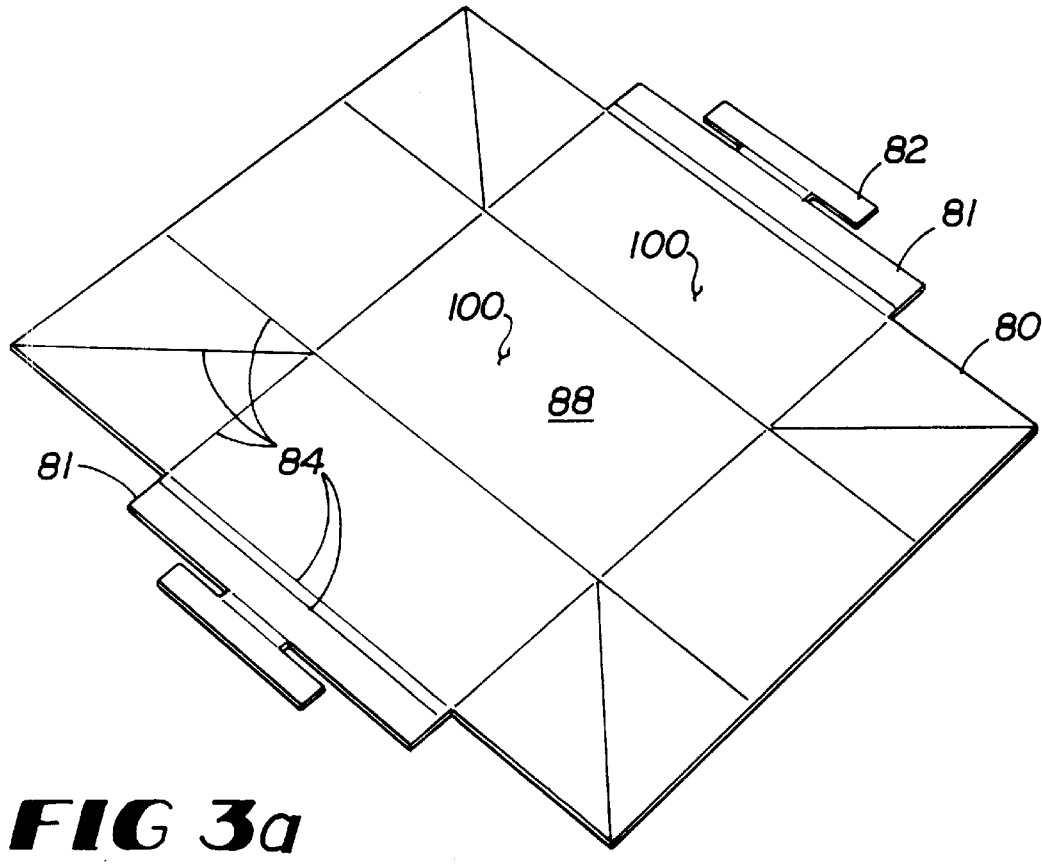
FIG. 3a is a perspective view of a unitary paper board blank with fold lines shown unassembled.

Outer container 52 is preferably fabricated of corrugated paper board to provide a sufficiently strong and rigid structure at a reasonable price. Outer container 50 is preferably fabricated of a unitary sheet 80 of corrugated paper board as shown in FIG. 3a. Fold-over panels 81 and engaging tabs 82 are struck from unitary sheet 80. Outer container 52 is assembled into a seamless box 83 shaped as a rectangular prism by causing unitary sheet 80 to be formed along fold lines 84 defined on unitary sheet 80. Folding along the fold lines 84 forms wings 85 that are folded about and caused to lie adjacent to side wall 86 which includes fold-over panel 81 along its upper edge. Fold-over panel 81 is then folded over in engagement with wings 85 and engaging tabs 82 are tucked between wings 85 and side wall 86, shown in phantom lines in FIGS. 2 and 3b, to lock wings 85 and side walls 86 in a rigid box structure. A lower edge 87 of fold-over panel 81 provides a convenient hand grip for lifting outer container 52. Construction of container 52 from unitary sheet 80 reduces the risk of leakage present in containers having segmented panel construction.

When completely assembled, box 83 includes a bottom wall 88 from which side walls 86 extend substantially perpendicularly. Bottom wall 88 and side walls 86 define an internal box volume 96 and a box opening 97. Outer container 50 also includes a paper board lid 89 of known construction. Lid 89 may be a structure separate from box 83, as shown in FIG. 2, or it may be hingedly attached to box 83 in a known manner. Lid 89 may be provided with a designated area 90 within which identifying indicia is written. Alternatively, lid 89 or box 83 may be provided with a pocket 93 attached to lid 89 or box 83 into which a card 94 with content identifying indicia thereon may be placed. The identifying indicia may include a variety of information including the type of cooking fluid, the source of the fluid and the type of food cooked in the fluid container assembly 51 is preferably of a shape that is stable when one container assembly is stacked on top of another, such as a cubic or cylindrical volume. By so configuring container assembly 51, container holding used cooking fluid may be stored in an environmentally controlled area indoors and the container stacked in a manner that conforms to available space.

By providing a seamless construction, the box 83 is inherently leak-resistant which is an important to the practical use of the present invention. In a preferred embodiment of the present invention an interior surface 100 of box 83 may be provided with a leak resistant coating to further enhance the leak resistance of box 83. Leak resistance of box 83 further ensures that cooking oil container and storage system 10 does not leak even if the integrity of inner container 54 is breached. The leak resistant coating may be in the form of a surface impregnating coating including a wax-based coating or acrylic-based coating such as those sold by the Michelman Company of Cincinnati, Ohio. These coatings are typically applied to stock paper board material from which unitary sheet 80 is struck. Other materials useful for providing a leak resistant coating to unitary sheet 80 include surface films such as a plastic film. Plastic films may be permanently adhesively applied to interior surface 100 of unitary sheet 80.

The paper board and the leak-resistant coatings or films used for fabricating outer container 52 must be capable of withstanding the anticipated temperatures of cooking oil 22 deposited in outer container 52. Advantageously, most commonly available paper board products have temperature ratings exceeding 400° F.

Inner container 54 preferably comprises a plastic bag 106 suitable for withstanding the chemical and thermal properties of cooking oil 22 to be disposed within bag 106. Plastic bag 106 includes a bag side wall 108 having an open end 110, defining a bag opening 112, and an opposed closed end 114. Bag 106 defines a bag interior volume 116 when bag 106 is supported in box 83. The length of bag side wall 108 is considerably longer than the height of box side walls 86 so that an upper portion or neck 118 of bag side wall 108 may extend out of box opening 97 and be draped over box 83 as is shown in FIG. 1.

In use, container assembly 51 is mounted within cart 50 and moved beneath a spout for drawing cooking oil. Inner container 54 is opened and preferably centered under the spout and a value is opened to release the cooking fluid. After the cooking fluid has been drained into inner container 54, cart 50 supporting filled container assembly 51 is moved out from under deep fryer cooker 12 by pulling on handle 66 and steering cart 50 accordingly. Then, inner container 54 is closed, preferably with a wire tie 120 or other suitable means such as a tape, string, or a deformable metal ferrule for example. Lid 89 is then engaged with side walls 86 to cover box opening 97. Information regarding the contents residing in the outer container 52 may be included in designated area 90 or on a card 94 which is then slipped into pocket 93.

With inner container 54 sealed, the lid in place and the contents indicated, container assembly 51 may then be moved conveniently to a storage area and deposited. Container assembly 51 is lifted from engagement with cart 50 and placed on a support surface or stacked on other container assemblies 51 currently residing in the storage area.

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

What is claimed is:

1. A cooking fluid container and storage system for containing and storing a cooking fluid from a deep fryer cooker having a cooking vessel defining a cooking fluid reservoir for containing the cooking fluid therein, said system comprising:

a cart, said cart being adapted for translation over a support surface; and a container assembly selectively mounted on said cart and supported thereby, said container assembly having an inner and outer container;

said cart further adapted to position said inner container to receive cooking fluid from an egress of a deep fryer cooker;

said inner container being selectively sealable to form a first barrier to enclose cooking fluid received from said fryer and said outer container being selectively removable from supported engagement with said cart.

2. The apparatus of claim 1, said outer container further comprising:

a bottom wall;

a sidewall extending from said bottom wall substantially perpendicular thereto, said bottom wall and said sidewall defining an outer container volume and an outer container opening adjacent said sidewall;

a container lid adapted to be engaged with said sidewall to cover said outer container opening; and said inner container comprising a relatively flexible bag having a bag sidewall defining a bag interior volume, and an open end defining a bag opening, and a closed end, said inner container being adapted to be disposed within said outer container in supported engagement with said bottom wall and said sidewall, and said open end of said inner container being accessible through said outer container opening such that a cooking fluid may be introduced into said inner container through said bag opening and be supported by said inner container within said outer container.

3. The apparatus of claim 1 wherein said cart and said container mounted thereon being sized and configured to be selectively positioned within a deep fryer to receive cooking fluid from said fryer.

4. The apparatus of claim 2 wherein said outer container is fabricated of a unitary sheet.

5. The apparatus of claim 5 wherein said outer container is seamless.

6. The apparatus of claim 2 wherein said bottom wall and said side wall of said outer container are coated with a leak resistant finish material.

7. The apparatus of claim 1 wherein said leak resistant finish is a surface impregnating material.

8. The apparatus of claim 7 wherein said leak resistant finish is a surface film in secured engagement with an inner wall surface of said bottom wall and said side wall of said outer container.

9. The apparatus of claim 2 wherein said relatively flexible bag is a plastic film bag having a body portion and a neck portion, said neck portion being adapted to extend outwardly of said outer container to drape over said outer container opening to receive cooking fluid from said fryer.

10. A container assembly for receiving and storing cooking fluids used in a deep fryer comprising:

a bottom wall;

a sidewall extending from said bottom wall substantially perpendicular thereto, said bottom wall and said sidewall defining an outer container volume and an outer container opening adjacent said sidewall;

a container lid adapted to be engaged with said sidewall to cover said outer container opening; and an inner container comprising a relatively flexible bag having a bag sidewall defining a bag interior volume, and an open end defining a bag opening, and a closed end, said inner container being adapted to be disposed within said outer container in supported engagement with said bottom wall and said sidewall, and said open end of said inner container being accessible through said outer container opening, said bag opening adapted to receive cooking fluid from an egress of a deep fryer cooker whereby said inner container holding cooking fluid is supported within said outer container.

11. The container assembly of claim 10 wherein said outer container is fabricated of a unitary sheet.

12. The container assembly of claim 10 wherein said outer container is seamless.

13. The container assembly of claim 10 wherein said bottom wall and said side wall of said outer container are coated with a leak resistant finish material.

14. The container assembly of claim 13 wherein said leak resistant finish is a surface film in secured engagement with an inner wall surface of said bottom wall and said side wall of said outer container.

15. The container assembly of claim 10 further comprising:

a cart; said cart being adapted for translation over a support surface; and said outer container of said container assembly being selectively mountable on said cart and supported thereby, said inner container being selectively sealable to form a first barrier to enclose cooking oil received from a fryer and said outer container being selectively removable from supported engagement with said cart so said container assembly may be transported to a position beneath a sprout bore of a fryer and said container assembly may be transported to a storage area.

* * * * *